United States Patent Office 2,833,385
Patented May 6, 1958

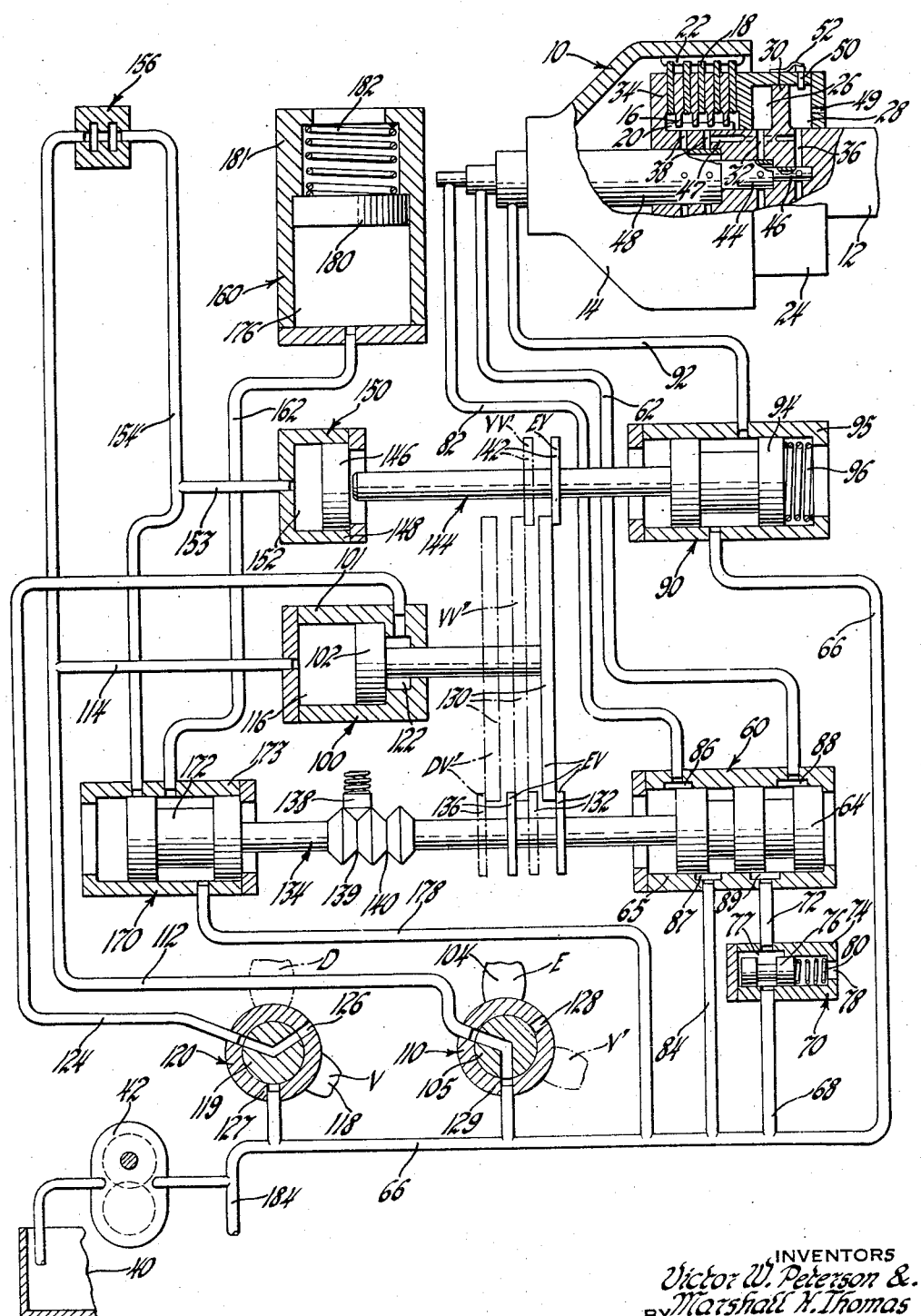

2,833,385

CLUTCH CONTROL WITH COOLING MEANS THEREFOR

Victor W. Peterson and Marshall H. Thomas, Indianapolis, Ind., assignors to General Motors Corporation, Detroit, Mich., a corporation of Delaware Application May 11, 1953, Serial No. 354,334

2 Claims. (Cl. 192—113)

This invention relates to hydraulic clutches of the type employing hydraulic cooling systems, and more particularly, to controlling systems therefor.

An object of the invention is to provide a hydraulic clutch with a control system for supplying hydraulic fluid to the clutch to engage the same, to disengage the same, and to cool the same during the periods of slip while the clutch is being engaged or disengaged.

A further object of the invention is to provide a hydraulic clutch with a control system wherein the clutch is engaged by relatively light hydraulic pressure to avoid abrupt clutching, wherein the clutching pressure is increased by centrifugal force to carry full load torque, and wherein the clutch is disengaged by relatively high hydraulic pressure to provide rapid declutching.

Further objects and advantages of the present invention will be apparent from the following description, reference being had to the accompanying drawing wherein a preferred form of the present invention is clearly shown.

The drawing is a somewhat schematic representation of a known type of clutch incorporating the control system of the invention.

The invention is particularly useful in aircraft power systems of the type employing contrarotating propellers driven through a pair of clutches by a pair of gas turbine engines. References may be had to the copending application of Peterson and Schnepel S. N. 174,052 filed July 15, 1950 for further details of such a system and for a specific structural disclosure of the clutches therefor.

The hydraulic clutch 10 includes a driving shaft 12 which may be driven from a gas turbine engine or other suitable source of power and a driven drum 14 which may supply power to an aircraft propeller or other suitable driven member. The clutch employs interleaved disks 16 and 18 respectively secured for axial movement and rotation to the driving shaft 12 and the driven drum 14 by internal and external splines 20 and 22 formed thereon. An annular member 24 is secured for axial movement on the driving shaft 12 and forms a pair of annular hydraulic actuating chambers 26 and 28 with a disk-like flange 30 of the driving shaft 12. The clutch is engaged by supplying hydraulic fluid under predetermined pressure through radial passages 32 to the clutch engagement chamber 26, thereby forcing the clutch disks together and against the disklike abutment 34 on the driving shaft. The clutch is disengaged by supplying hydraulic fluid under predetermined pressure through radial passages 36 to the disengagement chamber 28, thereby releasing the pressure on the clutch disks. The clutch disks are cooled and lubricated during the periods of engagement and disengagement by supplying hydraulic fluid under predetermined pressure through the radial passages 38, which fluid collects in the sump 40 of the gear pump 42 of the hydraulic system after flowing between the clutch disks. A plurality of slip tubes 44, 46 and 48 supply the clutch with engagement, disengagement and cooling fluids respectively.

A cross passage 47 connects the disengagement and coolant passages 36 and 38 to supply hydraulic fluid at insignificant pressure to the disengagement chamber 28 during the engaging period of clutch operation so that the hydrostatic presures due to centrifugal action in the engagement and disengagement chambers 26 and 28 will be substantially balanced, thereby preventing too abrupt clutching. The disengagement chamber 28 is provided with a bleed-off orifice 49 and with a bleed-off conduit 50 which is controlled by a spring-biased speed responsive valve 52. The orifice 49 will partially empty the hydraulic fluid in the disengagement chamber 28 at intermediate speeds of the shaft 12 while the clutch is being engaged. The speed responsive valve 52 is set to open at substantial or near operating speeds of the shaft 12 and empty or further empty the hydraulic fluid in the disengagement chamber 28. The hydraulic pressure due to centrifugal action in the engagement chamber 26 is therefore not balanced at the higher speeds by hydrostatic pressure in the chamber 28 and thus augments the static pressure in the engagement chamber 26 from the pump 42 to enable the clutch disks to transmit high loads without slip. The disengagement chamber 28 is supplied with hydraulic fluid at a higher pressure during the disengagement period of the clutch than that supplied to the engagement chamber 26 during the engagement period of the clutch. The engagement of the clutch is thus relatively slow with respect to disengagement as an abrupt clutching to the load might be destructive while a rapid declutching from the load is desirable.

A clutch actuating flow valve 60 supplies engagement fluid, preferably oil, at reduced pressure to the clutch through a conduit 62 when the double-spool valve piston 64 is in the solid line or right-hand position EV in the valve cylinder 65. The outlet manifold 66 of the gear pump 42 delivers the hydraulic fluid to the clutch actuating flow valve 60 through a conduit 68, a spool-type pressure regulating reduction valve 70, and a conduit 72. The pressure reduction valve 70 includes a cylinder 74 and a spool valve piston 76 slidable therein. The left face of the valve piston 76 is subjected to the outlet pressure in the conduit 72 by a groove 77 while the right face of the spool is subjected to atmospheric pressure through a vent 78 and to resilient pressure from a spring 80; the spring pressure being suitably chosen so that the pressure in the conduit 72 is maintained at a fixed value substantially less than the system or pump pressure in the conduit 68.

The clutch actuating flow valve 60 also supplies disengagement oil to the clutch. The disengagement oil is supplied at full system pressure through the conduit 82 from the conduit 84 when the double-spool valve piston 64 is in the dotted line or left-hand position DV'. The clutch disengagement chamber 28 is vented to the sump 40 through a groove 86 in the cylinder 65 when the double-spool valve piston 64 is in the EV position and the engagement chamber 26 is vented through a groove 88 when the piston is in the DV' position. Grooves 87 and 89 supply oil from the conduits 84 and 72 to the annular chambers formed by the cylinder 65 and piston 64 in either EV or DV' position.

A clutch coolant valve 90 supplies cooling and lubricating oil to the clutch disks through a conduit 92 at pump or system pressure from the conduit 66 when the single-spool valve piston 94 is in the solid line or right-hand EV position in the valve cylinder 95. The spool valve piston 94 cuts off the flow of coolant to conduit 92 when in the dotted line or left-hand VV' position and is so biased by a spring 96.

The spool 64 of the clutch actuating flow valve 60 is operated by a double-acting servomotor 100 which has a cylinder 101 and a piston 102 slidable therein. The piston 102 is moved to the solid line or right-hand EV position when the operating lever 104 and rotary plug 105 of a control valve 110 are placed in the solid line or E position to transmit fluid from the conduit 66 through the conduits 112 and 114 to pressurize the servomotor chamber 116 and the operating lever 118 and rotary plug 119 of a control valve 120 are placed in the solid line or V position to vent the servomotor chamber 122 to the sump 40 through a conduit 124 and an outlet 126 in the cylinder 127 of the valve 120. The piston 102 is moved to the dotted line or left-hand DV' position by placing the operating lever 104 of the control valve 110 in the dotted line or V' position to vent the servomotor chamber 116 to the sump 40 through the outlet 128 in the cylinder 129 of the control valve 110 and by placing the control lever 118 of the control valve 120 in the dotted line or D position to pressurize the servomotor chamber 122.

The servomotor 100 and the clutch actuating valve 60 are engageably linked together by a push plate 130 that is secured to the servomotor piston 102 to engage a flange 132 on the valve stem 134 of the clutch actuating valve 64 to engage the clutch when moved to the EV position and to engage a flange 136 to disengage the clutch when moved to the DV' position. A spring-biased detent 138 cooperates with the annular notches 139 and 140 on the valve stem to retain the same in the EV and DV' positions. The push plate 130 is movable from the EV to the VV' position without effecting movement of the valve stem 134 because of the spacing between the stem flanges 132 and 136.

The coolant flow valve 90 is also engageably linked to the push plate 130 of the servomotor 100, an annular flange 142 on the stem 144 of the coolant valve being engageable with the push plate 130 between the EV and VV' positions. The coolant valve stem 144 is also engageably linked with the piston 146 of a dashpot servomotor 150 between the EV and VV' positions. The piston 146 and cylinder 148 of the servomotor 150 form a chamber 152 which connects by conduits 153 and 154 to the control valve 110 through a metering orifice or bleed 156 and the conduit 112. The chamber 152 also communicates with an accumulator 160 through a conduit 162 and an accumulator control valve 170. The spool valve piston 172 of the accumulator control valve 170 is slidable in the cylinder 173 and is secured to the stem 134. The accumulator control valve 170 places the chamber 176 of the accumulator 160 in communication with the system pressure conduit 66 through the conduits 162 and 178 when the stem 134 is in the EV position; and cuts off this communication to place the accumulator chamber 176 in communication with the dashpot servomotor chamber 152 and the bleed 156 through the conduits 162, 153, and 154 when the stem 134 is in the DV' position. The accumulator 160 includes a piston 180 which is moved upwardly in a cylinder 181 against a spring 182 when the chamber 176 is charged with system pressure when the accumulator spool valve 172 is in the EV position, the spring 182 serving to empty the chamber 176 to the conduits 153 and 154 when the accumulator spool valve 172 is in the DV' position.

The foregoing description covers the essential elements of a single clutch and its control system and it should be understood that the gear pump 42 may be utilized to supply fluid to another clutch through a similar control system through a branch conduit 184. It should also be realized that the control valves 110 and 120 may be manually operated independently of each other or coordinated to a single control through a suitable linkage, and may be actuated by solenoids under the supervision of remote control switches if desired.

Although it is believed that the manner of operation of the components of the system disclosed herein will be apparent to those skilled in the art from the foregoing, the operation will be briefly reviewed through the various clutching and cooling phases.

*Engaging phase—cooling oil "on"*

The control valve 110 is placed in the E position thereby charging the chamber 116 of the servomotor 100, and the control valve 120 is placed in the V position thereby venting the chamber 122 of the servomotor 100 to the sump 40. The control valve 110 also commences to charge the chamber 152 of the dashpot servomotor 150 and the chamber 176 of the accumulator 160 at a reduced rate through the bleed 156 and the accumulator control valve 170. The servomotor push plate 130 moves from the DV' position to the EV position thereby moving the coolant flow valve 90 from the VV' position to the EV position and the accumulator control valve 170 and clutch actuating valve 60 from the DV' position to the EV position. The clutch actuating valve 60 supplies the engagement side of the clutch with oil under reduced pressure and vents the disengagement side of the clutch to the sump. The clutch coolant valve 90 supplies the clutch disks with coolant oil at full system pressure. The control valve 110 continues to charge the dashpot servomotor 150 and the accumulator control valve 170 continues to charge the accumulator 160 but from the conduit 178 rather than the bleed 156. The clutch is thus engaged.

*Full engagement phase—cooling oil "off"*

With the clutch brought up to speed and its engagement complete, the control valve 110 is placed in the V' position thereby venting the chamber 116 of the servomotor 100 and the chamber 152 of the dashpot servomotor 150. The coolant valve spring 96 thereupon moves the coolant valve stem 144 from the EV to the VV' position, cutting off the flow of coolant to the clutch, being damped in this movement by the restricted discharge of the oil in the dashpot servometer chamber 152 through the bleed 156. The push plate 130 of the servomotor 100 is likewise moved by the spring 96 from the EV position to the VV' position, but this movement does not affect the position of the clutch actuating valve 60 and accumulator control valve 170 which remain in the EV position. The cooling oil is thus shut off while the clutch is engaged.

*Disengagement phase—cooling oil momentarily "on"*

The control valve 120 is placed in the D position to charge the chamber 122 of the servometer 100. The servometer push plate 130 thereupon moves from the VV' position to the DV' position placing the clutch actuating valve 60 and the accumulator control valve 170 in the DV' position. The clutch actuating valve 60 vents the engagement side of the clutch and commences the filling of the disengagement side of the clutch with oil under system pressure (the disengagement side of the clutch having been gradually emptied during the full engagement phase by the orifice 49 and the speed responsive valve 52). The accumulator control valve 170 concurrently places the charged chamber 176 of the accumulator 160 in communication with the chamber 152 of the dashpot servomotor 150 and cuts off its communication with the system pressure supply conduit 178. The accumulator spring 182 (which is considerably heavier than the coolant valve spring 96) thereupon moves the accumulator piston 180 to discharge some of the content of the large accumulator chamber 176 into the smaller dashpot servomotor chamber 152, forcing the coolant valve 90 from the VV' position to the EV position, thereby delivering cooling oil to the clutch at system pressure. The disengagement side of the clutch is now filled and the clutch is rapidly disengaged by the full system pressure, the flow of cooling oil aiding in separation of the clutch disks. The oil in the dashpot servomotor chamber 152 and the remaining oil in the accumulator chamber 176 slowly discharges to the sump 40 through the bleed 156 and control valve 110 under the influence of the accumulator spring 182 and the coolant valve spring 96 whereupon the coolant valve 90 moves from the EV to the VV' position cutting off the flow of cooling oil to the clutch. The clutch is thus disengaged and the cooling oil shut off.

While the preferred embodiment of the invention has been described fully in order to explain the principles of the invention, it is to be understood that modifications in structure may be made by the exercise of skill in the art within the scope of the invention, which is not to be regarded as limited by the detailed description of the preferred embodiment.

We claim:

1. A clutching system comprising, in combination, a driving shaft, a driven shaft, a hydraulically operated clutch for coupling the driving shaft to the driven shaft, means for supplying engaging and disengaging fluid to the clutch including a first valve, means for supplying cooling fluid to the clutch including a second valve, a first hydraulic motor for operating the first valve to engage and disengage the clutch and for opening the second valve to supply cooling fluid to the clutch while it is being engaged, means for terminating the supply of cooling fluid to the clutch by closing the second valve after the clutch is fully engaged, and means for momentarily reopening the second valve to supply cooling fluid to the clutch while it is being disengaged including a second hydraulic motor.

2. A clutching system comprising, in combination, a driving shaft, a driven shaft, a hydraulically operated clutch for coupling a driving shaft to the driven shaft, means for supplying engaging and disengaging fluid to the clutch including a first valve, means for supplying cooling fluid to the clutch including a second valve, a first hydraulic motor for operating the first valve to engage and disengage the clutch and for opening the second valve to supply cooling fluid to the clutch while it is being engaged, means for terminating the supply of cooling fluid to the clutch by closing the second valve after the clutch is fully engaged; and means for momentarily reopening the second valve to supply cooling fluid to the clutch while it is being disengaged including a second hydraulic motor, an accumulator for charging the second hydraulic motor, a third valve operable with the first valve to connect the accumulator and the second hydraulic motor, and a bleed for slowly releasing the charge of the accumulator and the second hydraulic motor.

References Cited in the file of this patent

UNITED STATES PATENTS

| | | |
|---|---|---|
| 847,834 | Sears et al. | Mar. 19, 1907 |
| 1,249,736 | Frink | Dec. 11, 1917 |
| 2,386,220 | Lawler et al. | Oct. 9, 1945 |
| 2,437,430 | Lawrence | Mar. 9, 1948 |
| 2,498,123 | Hobbs | Feb. 21, 1950 |
| 2,642,844 | Flinn | June 23, 1953 |
| 2,658,596 | Archambault | Nov. 10, 1953 |
| 2,690,248 | McDowall | Sept. 28, 1954 |
| 2,736,412 | Livezey | Feb. 28, 1956 |

FOREIGN PATENTS

| | | |
|---|---|---|
| 509,277 | Great Britain | July 13, 1939 |
| 150,301 | Great Britain | Oct. 7, 1920 |